Patented Oct. 10, 1944

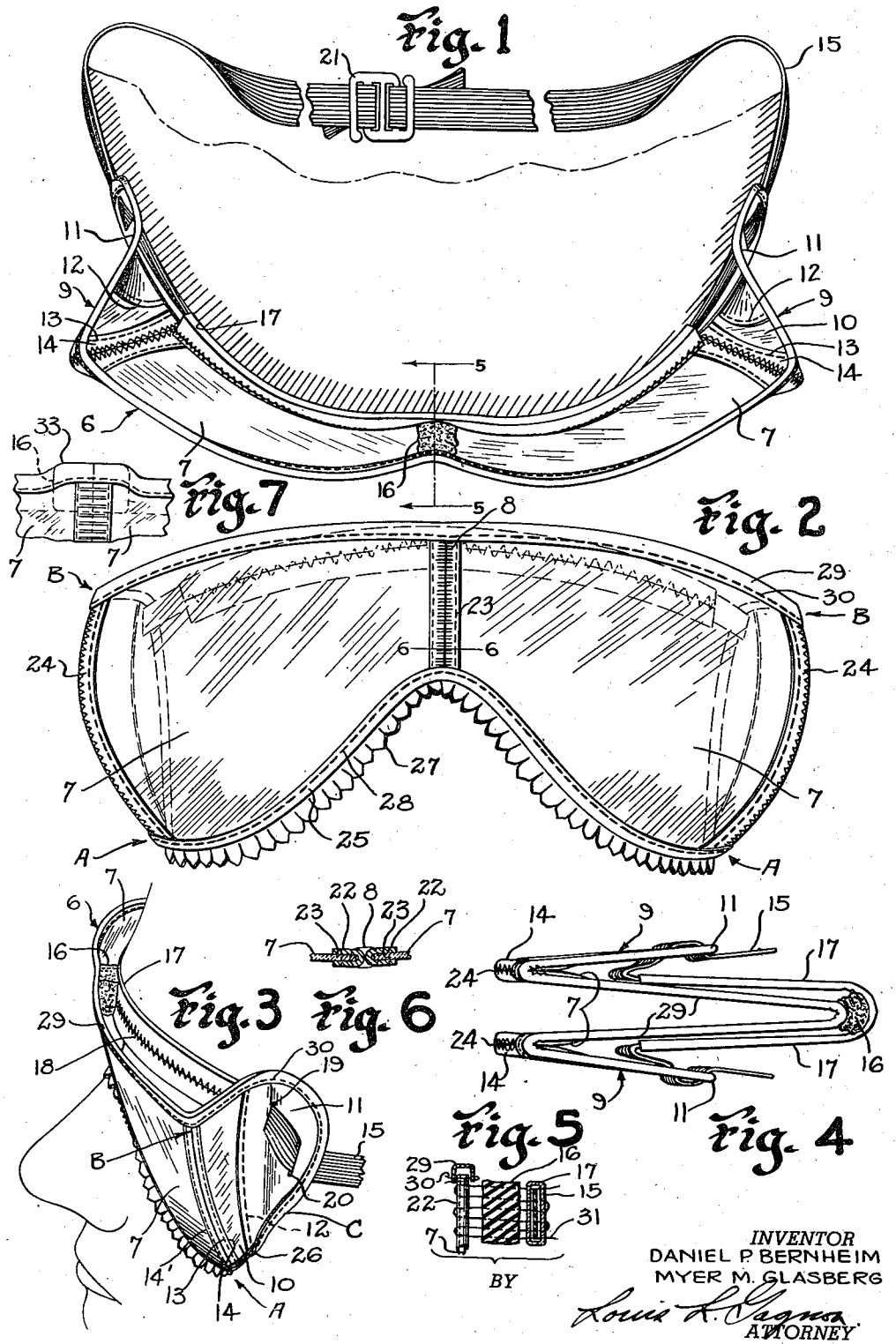

2,359,743

UNITED STATES PATENT OFFICE 2,359,743

EYE PROTECTION MEANS

Daniel P. Bernheim, Southbridge, and Myer M. Glasberg, Revere, Mass., assignors to American Optical Company, Southbridge, Mass., a voluntary association of Massachusetts Application April 20, 1942, Serial No. 439,690

14 Claims. (Cl. 2—14)

This invention pertains to an eye protection device and more particularly to a shield type protection device so constructed as to provide a wide protective field of vision therethrough and novel means of ventilation.

One of the principal objects of the invention is to provide adjustable means for fitting the eye protection device to the various head and facial characteristics of different individuals, and also to vary the ventilating characteristics of the eye protection device.

A further object of the invention is to provide means for varying the position of the side flaps of the eye protection device while permitting adequate side vision while maintaining a desirable ventilating and proper facial fit of the eye protection device for the individual.

A further object of the invention is to provide a foldable eye shield of the class described, which eye shield may be folded for reducing the overall size thereof to permit packing in a minimum of space.

A further object of the invention is to provide an adjustable headband which may be resilient, and spacing said headband from the upper front portion of the eye protection device to permit adequate circulation of air in the rear of said eye shield.

A further object of the invention is to provide a resilient headband portion which acts as a limiting means to restrict the inward movement of the side or end flap portion of the eye protection device.

A further object of the invention is to control the position and fit of the headband with the individual using same whereby the contact of the headband with the forehead of the individual will be above the eyebrows.

A still further object of the invention is to provide an eye protection device having wedge shaped portions on the sides to afford a natural spacing member so that the individual eye shields of the eye protection device will have the lower portion closer to the face than the upper portion.

In the drawing:

Fig. 1 is a top view of the eye protection device represented as behind in position for use on the face of the wearer;

Fig. 2 is a front view of the eye protection device in position for use as shown in Fig. 1;

Fig. 3 is a perspective view of Fig. 1 clearly showing spacing between the brow pad or headband and the upper portion of the eye protection device;

Fig. 4 is a top view of the eye shield shown folded;

Fig. 5 is a sectional view taken substantially along lines 5—5 of Fig. 1 to show the relation of certain parts to each other;

Fig. 6 is a sectional view taken along line 6—6 of Fig. 2;

Fig. 7 is a fragmentary view of a slightly modified form of shield structure adjacent the center thereof to which the spacer pad is attached.

Referring to the drawing and more particularly to Figs. 1 and 2, an eye protecting device 6 is formed of two transparent eye shields 7 which are hingedly connected by stitching 8 and have end spacing members 10 which are of transparent material, which end spacing members are wedge shaped, having the narrowest portion of the wedge at the bottom of the eye shield with the wider portion at the top, so that the top of the eye shields adjacent the temples of a wearer wil be spaced farther from the face than the lower portion of the eye shield. An end flap 9 has a pad 11 made of leather or other suitable material, which pad 11 is stitched to the inner edge of the end spacing member 10 by stitching 12. The outer edge of the end spacing member being connected by stitching 13 to a leather binding portion 14, which binding portion is folded over the outer edge portion of the spacing member 10 and secured by said stitching 13.

The top spacing member 16 is located on the upper central portion in the rear of the eye protecting device and has connected thereto a headband 15 which is partially encased in a leather brow pad 17. The brow pad, headband, and top spacing member are connected by stitching intermediate the individual eye shields 7 by stitching which goes through the various parts and over certain of the hinge stitching 8 so that when the headband is fitted on an individual the spacing member 16 will be above the bridge of the nose on the brow.

The brow pad 17 is a sheath of soft leather which is stitched together at 18 forming a flat envelope through which the headband extends from the approximate center position of the top spacing member rearwardly on both sides and passes through two slots 19 and 20 of the end pads, rearwardly to a suitable headband connecting member 21.

Figure 6 shows an enlarged sectional view taken along lines 6—6 of Fig. 2 to more clearly show the hinge connection between the eye shield portions 7—7.

The inner vertical edges of the transparent eye shield members 7 have a leather edging 22 which has stitches 23, see Fig. 2, connecting the edging 22 to the eye shields 7. The hinge stitching 8 goes through the edging 22 and the eye shields 7 and becomes a hinge to permit the two sides of the eye shields to be moved in relation to each other so that a hinge is formed therebetween to permit folding as shown in Fig. 4.

The eye shields 7 and the end spacing members 10 each have a construction substantially similar to that shown in Fig. 6. The hinge stitching 24 between the eye shields 7 and the end flaps 10 is analogous to the hinge stitching 8 shown in Fig. 6. The leather edging 14' adjacent the outer side extremities of the eye shields 7 is secured to the eye shield 7 in the same manner as that already described for the inner vertical portions of the eye shield 7.

A bottom edging 25 of leather extends on the front of the individual eye shield portions 7 completely across the front of the eye protecting device rearwardly to approximately the location point 26 adjacent the end spacing members. This edging may be a flat strip of leather which is placed on the front, while a pinking leather edge 27 is placed on the reverse side of the lower edge of the eye protecting device, said lower front edging 25, and said pinking leather edging 27 being both stitched to the lower peripheral edge of the eye protecting device by stitching 28.

An upper edging 29 made of leather extends completely around the upper peripheral edge of the eye protecting device rearwardly across the upper edge of the end spacing member, about the edge of the end pad members 11 and downwardly to approximately location point 26 on either side of the end flaps, and is secured about said edge by stitching 30.

The top spacing member 16 may be of any suitable material and in the present case is disclosed as being a piece of sponge rubber of sufficient thickness to provide adequate spacing between the brow pad 17 and the hinge stitching 8 so that the eye shields will be properly spaced from the brow at all times when the eye protecting device is in position of use on the face of the wearer.

Figure 5 is an enlarged exploded view of the top spacing member 16 shown spaced from the brow pad 17 with the headband 15 located therein. The upper edging 29 is shown stitched at 30 to one of the eye shields 7 having the edging 22 located thereon. The stitching 31 is shown generally in its proper position for securing the various parts together, it being understood that the stitching 31 is located generally between the edgings 22 (Fig. 6) and overlie a portion of the hinge stitch 8.

The headband after emerging from the free ends of the brow pad 17 extends through two slots 19 and 20 which are spaced one from another in each of the end pads. It will be noted in Fig. 1 that the end spacing members 10 extend inwardly toward the temples of the wearer, and the tension on the headband causes the end pads 11 to bend and substantially form a natural shape conforming to the contour of the temple portions of the wearer where the temple portions are engaged by the end pad 11. By this means, it is possible to provide a comfortable pad which not only adopts a natural shape conforming to the contour of the individual wearing the same but closes the areas around the edge of the pad to exclude wind, snow, and the like from being blown endwise on the inside of the eye protecting device.

The view shown in Fig. 4 discloses the eye protecting device in a folded position with the end flaps 9 closed onto the eye shield portions with the brow pad 17 being spaced from the hinge connection between the eye shield 7 by the top spacing member 16. The head band 15 is shown as being passed through the slot openings in the flap 11. In this feature it will be seen that the closed device can be further placed together until the adjacent surfaces are touching. Ordinarily, when the eye protecting device is folded as shown in Fig. 4, it is ready to be inserted within a small carrying case to prevent injury to the eye shields and the various other elements which comprise the composite eye protecting device.

The brow pad not only prevents perspiration and moisture generally from contacting the elastice headband within the brow pad, but said brow pad also acts as a limiting means for restricting the inward movement of the end flaps. The slots 19 and 20 in the end flaps permit the headband to be moved therein so that the flaps may be moved inwardly or outwardly at will for angularly positioning the end flaps in relation to the remainder of the eye protecting device so that the spacing between the face of the wearer and the eye protecting device may be varied to more or less regulate the ventilation of the eye protecting device, and for comfort, and to adjustably and properly fit the face of the individual wearing same. The material of which the individual transparent eye shields 7 is made may vary under conditions of use for which the eye protecting device may be adapted. However, in the present case it is pointed out that the eye protecting shields per se are made of a transparent light polarizing medium such as is commonly referred to as polaroid. Naturally, the polarizing axis will be vertically disposed for proper protection against reflected light. The end spacing member may also be of polaroid but may also be of a non-polarizing material such as an acetate. The eye shields 7 and the end spacing members are flexible but substantially rigid so that when the eye protection is in use, there will be a suitable arching of the eye shields 7 so that they will bend outwardly away from the face of the wearer particularly at the outer edges thereof as more clearly shown in Figs. 1 and 2 in contrast with the flattened surfaces of the eye shields 7 shown in Fig. 4. It is also pointed out that the curved outer edges of the eye shields 7 have the hinge stitch 24 therealong so that as the end of flap 9 is moved outwardly in a sidewise direction there will be an increased arching or convex cupping action of the individual eye shields in a direction away from the eyes along the vertical axes thereof and slightly in the direction of their horizontal axes, since the vertical distance of the eye shields adjacent the bridge of the nose is appreciably shorter than the vertical distance of the eye shields at the outer edges thereof, there being sufficient curvature to cause the eye shields 7 to be bowed outwardly away from the face of the wearer. The stitching 24 on the outer ends of the eye shields being curved with the outer edges of the eye shields being bowed when the end flaps are moved outwardly. The end spacing members 10 are shown as being of transparent material for the purpose of increasing the side vision, but it is to be understood that the spacing members may be of an opaque material if it is desirable. The end spacing members are preferably formed of a transparent acetate material of a color substantially the same as the material for the front main shield portion 7.

The shape and means of assembly of the various elements play an extremely important part in the composite structure. The various parts have been shaped, as shown in the drawing, with a view to accomplishing specific results.

For example, the front sections 7 must be of a certain height between points A and B to provide the desired width of field of vision in said direction while at the same time avoiding making the device too cumbersome. The outward curving of the sides of the shields 7 is important in obtaining the desired cupping effect of the front when in position of use on the face. The shape of the lower contour edges of the portions of the sections 7 which communicate with each other at the center of the shield and are joined by the hinge 8 are carefully controlled in order to fit properly about the nose. The shape of the remainder of the lower contour edge is also controlled to obtain an intimate fit with the cheek bones of the face of the individual. The contour edge of the front or main shield portions 7 is so controlled as to fit comfortably and properly with the greatest majority of different individuals. The upper contour edges of the portions 7 when joined with each other as shown in Fig. 2 curve upwardly from adjacent the points B to provide an attachment area adjacent the upper nasal sides of said portions 7 for the spacer member 16 and brow pad 17. This locates the brow pad 17 in a position where it will engage the forehead above the brow line.

The slots 19 and 20 in the side members 11 are so controlled as to their positional and angular relation with each other as to insure that the brow pad 17 will extend in a substantially continuous curve throughout the width of the forehead without danger of causing the shield member to become distorted and assume a shape other than that desired when in proper fitted relation with the individual. To control this continuous curve effect the slot 19 must be located in proper position in the side member 11 and also be disposed substantially in the direction of the plane of the surface brow pad engaging the forehead. This will insure a continuous side surface contact of the brow pad 17 with the forehead and the angle of the slot 19 must be properly controlled to bring about this result. The slot 20 as shown in Fig. 3 is located considerably below the slot 19 at the point intermediate the lower edge A and the slot 19. This slot 20 is disposed substantially parallel with the slot 19 although in an offset position below said slot 19 and, when the headband 15 is threaded through said slots 19 and 20 and a pulling action is exerted thereon as when in position on the head the offset relation of said slots 19 and 20 will cause the slots to binding effect to prevent the headband from moving longitudinally through said slots and will simultaneously cause the force of the pull to be directed at the location of the slot 20 and therefore cause the lower edge of the shield and the brow pad 17 to be drawn into an intimately fitted relation with the face. The contour shape and flexibility of the members 11 also plays an important part in the proper functioning and must be carefully controlled. It will be noted, as shown in Fig. 1, that when the headband 15 pulls the brow pad 17 into proper engagement with the forehead, the pulling action on the band will cause the section of the members 11 between the slots 19 and 20 to turn outwardly and follow the curve of the headband and thereby assume a comfortable wide area side surface contact with the sides of the head. To insure that the shield properly fits the particular individual as to the distance between the side members 11 the headband may be initially drawn through the slots 19 and 20 to shorten or lengthen the distance between said side members 11 according to the requirements of the individual.

It is to be noted that the brow pad 17 is formed of a relatively non-resilient material such as leather or other suitable material which, when a pulling action is exerted on the headband 17 tending to cause said headband to stretch in a longitudinal direction there will be no individual shifting action throughout the length of the brow pad which engages the forehead therefore insuring greater comfort. The edge C of the side members 11 extends downwardly and forwardly at such an angle as to assure a proper intimate fit of the portion of the shield adjacent the point A with the face. The side members 11 are relatively wide adjacent the tops thereof so as to function cooperatively with the spacing members 10 to hold the upper portions of the main shields 7 in proper spaced relation with the forehead to assure proper ventilation. This space is controlled by the distance between the slots 19 and the forward points B at the upper temporal sides of the shields 7 and by the thickness of the spacer member 16.

The outwardly curved shapes of the side edges of the shield sections 7 and the forward edges of the spacer members 10, when said members are stitched together along said edges, as indicated at 24 in Fig. 2, tend to cause said stitched edges to resist the outward movement of the side members 10 resulting in a slight buckling of the front sections 7 adjacent said curved edges causing said sections 7 to have a slightly bulging curve throughout the portion thereof before the eyes and simultaneously tend to cause the entire shield structure to assume and retain a given shape which will properly fit when in position on the face.

In Figure 7 there is shown a slight modification whereby the upper nasal edges of the shield section 7 are extended upwardly as illustrated at 33 to provide a high attachment seat to which the resilient spacer pad 16 might be secured. This causes the pad 16 and the brow pad 17 at the center of the shield to be located at a higher position and to have a higher point of contact with the forehead. This arrangement is particularly desirable for certain individuals who have receding foreheads with protruding brows.

The spacer member 16 although specified as being formed of rubber, it is to be understood that it may be formed of any desirable material either of soft, resilient, or hard type.

From the foregoing description it will be seen that the applicants have provided simple, efficient and economical means of accomplishing all the objects and advantages of the invention.

Having described our invention, we claim:

1. An eye protection device of the class described having transparent front eye shield means, side eye shield means connected adjacent the sides of said front eye shield means, each of said side eye shield means having a resilient portion for engaging the face of a wearer, and a continuous headband having a section extending longitudinally of the front shield means adjacent said shield means and adjustably connected with the resilient portions of the side shield means whereby the initial distance between the side shield means may be varied.

2. An eye protection device of the class described having transparent front eye shield means, side eye shield means each having a relatively rigid portion secured adjacent its forward edge to the ends of said front eye shield means, said side eye shield means each having a portion of flexible material joined with the rigid portion for engaging the face of a wearer with a side surface contact, a continuous headband having a front section adjustably connected with the resilient portion of each of the side shield means, a protective covering for the headband on the front portion thereof, and spacing means supported intermediate said headband protective covering and the front eye shield means substantially centrally of said eye shield means.

3. An eye protection device of the class described comprising a transparent shield for the eyes, having an upper edge with a high point intermediate its ends, spacing means located substantially at the high point of the shield extending rearwardly to provide a spacer member between the shield and the brow of the wearer when the eye protection device is in position for use, said shield having side portions, a headband having a section secured to the spacing means and threadedly connected with the side portions of the shield for supporting the protection device in position of use.

4. An eye protection device comprising a main front shield portion having side shield portions hingedly connected therewith, a relatively long and slender bearing pad extending in the direction of the upper longitudinal edge of the main front shield portion and secured to said main front shield portion intermediate the ends thereof and adjacent the top of said main shield portion and a headband extending longitudinally of and through said pad portion and threadedly connected with the side shield portions whereby the initial distance between said side shield portions may be altered.

5. An eye protection device of the class described comprising a main front shield portion constituting two sections hingedly connected intermediate the ends thereof for folding movement one over the other, and for positioning said sections in longitudinal relation with each other, side shield members connected with said sections adjacent the outer sides thereof, said side shield members having flexible portions and a continuous headband having a section located adjacent to and extending in a direction longitudinally of said main shield portion and threadedly connected with the flexible portions of said side shield members so as to have a frictional contact therewith whereby the initial distance between said side shield portions may be altered and frictionally held in said relation.

6. An eye protection device of the class described comprising a main front shield portion constituting two sections hingedly connected intermediate the ends thereof for folding movement one over the other and for positioning said sections in longitudinal relation with each other, side shield members connected with said sections adjacent the outer sides thereof, said side shield members having flexible portions, a continuous headband having a section adjacent to and extending in a direction longitudinally of said main shield portion and threadedly connected with the flexible portions of said side shield members, and a spacer member secured between the headband and the center of the main front shield portion for spacing said front shield portion at a given distance from said headband.

7. An eye protection device of the class described comprising a main front shield portion having side shield members with flexible portions, said flexible side shield portions having spaced slots therein, one positioned above the other, and a continuous headband having a section adjacent to and extending in a direction longitudinally of the main front shield portion and having portions threaded through said spaced slots in the flexible portions of the side shields adapted to dispose said flexible portions substantially in the direction of the plane of the headband for side surface engagement of said flexible portions with the head of the wearer when in position of use on the face.

8. An eye protection device of the class described comprising a main front shield portion having its lower edge shaped to fit about the nose and engage with the cheeks of the wearer below the eyes and having an upwardly curved upper contour edge, side shield members secured to the sides of the front shield portion and adapted to extend in a direction rearwardly thereof when in position of use, said side shield members having flexible portions with spaced slots therein, one positioned above the other, a forehead pad extending in a direction longitudinally of the front shield portion adjacent the top thereof, and a headband interconnected with said forehead pad and having portions threaded through the spaced slots in the flexible portions of the side shield members.

9. An eye protection device of the class described comprising a main front shield portion having its lower edge shaped to fit about the nose and engage with the cheeks of the wearer below the eyes and having an upwardly curved upper contour edge, side shield members secured to the sides of the front shield portion and adapted to extend in a direction rearwardly thereof when in position of use, said side shield members having flexible portions with spaced slots therein, one positioned above the other, a forehead pad extending in a direction longitudinally of the front shield portion adjacent the top thereof, a head band interconnected with said forehead band and having portions threaded through the spaced slots in the flexible portions of the side shield members, and a spacer member secured between the forehead pad and the central portion of the main shield portion adjacent the upper edge thereof.

10. An eye protection device of the class described comprising a main front shield member having its lower contour edge shaped to fit about the nose and to engage the cheeks at the sides of the nose below the eyes and having convexly curved side edge portions, side shield members having convexly curved edge portions secured to the convexly curved side portions of the main front shield member and having rearwardly extending flexible portions, said flexible portions having spaced slots therein, one positioned above the other, and a headband threadedly connected in said slots, with a portion thereof extending in a direction longitudinal of the main front shield portion intermediate the side shield members substantially along the upper edge of said main front shield member, being adapted to cause the adjacent parts of said flexible portions of the side shield members to be disposed in the direction of the headband and to have side surface contact with the face when in position thereon.

11. An eye protection device of the class described comprising a main front shield member having its lower contour edge shaped to fit about the nose and to engage the cheeks at the sides of the nose below the eyes and having convexly curved side edge portions, side shield members having convexly curved edge portions secured to the convexly curved side portions of the main front shield member and having rearwardly extending flexible portions, said flexible portions having spaced slots therein, one positioned above the other, a headband threadedly connected in said slots, with a portion thereof extending in a direction longitudinal of the main front shield portion intermediate the side shield members substantially along the upper edge of said main front shield member, being adapted to cause the adjacent parts of said flexible portions of the side shield members to be disposed in the direction of the headband and to have side surface contact with the face when in position thereon, and a brow pad secured to said headband throughout the major portion of said headband extending between the side shield members.

12. An eye protection device of the class described comprising a main front shield member having its lower contour edge shaped to fit about the nose and to engage the cheeks at the sides of the nose below the eyes and having convexly curved side portions, side shield members having convexly curved edge portions secured to the convexly curved side portions of the main front shield member and having rearwardly extending flexible portions, said flexible portions having spaced slots therein, one positoned above the other, a headband threadedly connected in said slots, with a portion thereof extending in a direction longitudinal of the main front shield portion intermediate the side shield members substantially along the upper edge of said main front shield member, being adapted to cause said flexible portions of the side shield members to have side surface contact with the face when in position thereon, a brow pad secured to said headband throughout the major portion of said headband extending between the side shield members, and a spacer member between said brow pad and the upper intermediate portion of the main front shield member.

13. An eye protection device comprising transparent eye shield means having a nasal recess in the lower edge thereof adapted to be positioned before the eyes of a wearer, end members having front edge portions connected adjacent the opposed outer side edges of the eye shield means and extending rearwardly thereof a greater amount at the top than at the bottom, said end members having rear edge portions disposed toward the face and tapering downwardly and forwardly substantially continuously from the top of said edge portions to the bottoms thereof and thereby causing said end member to be of a tapering wedge shape when viewed from the side, with the base of the wedge at the top and the apex positioned adjacent the lower edge of the eye shield means and means for holding the eye protection device in position of use on the face of the wearer with the wedge-shaped end members functioning to retain the upper edge of the eye shield means in spaced relation with the face.

14. An eye protection device comprising transparent eye shield means having a nasal recess in the lower edge thereof adapted to be positioned before the eyes of a wearer, and members having front edge portions connected adjacent the opposed outer side edges of the eye shield means and extending rearwardly thereof a greater amount at the top than at the bottom, said end members having rear edge portions disposed toward the face and tapering downwardly and forwardly substantially continuously from the top of said edge portions to the bottoms thereof and thereby causing said end members to be of a tapering wedge shape when viewed from the side, with the base of the wedge at the top and the apex positioned adjacent the lower edge of the eye shield means and means for holding the eye protection device in position of use on the face of the wearer with the wedge-shaped end members functioning to retain the upper edge of the eye shield means in spaced relation with the face, said eye shield means having a spaced member positioned substantially intermediately and adjacent the upper edge portion thereof and extending rearwardly to engage the face and to function cooperatively with the wedge-shaped end members for retaining the said upper edge of the eye shield means in spaced relation with the face.

DANIEL P. BERNHEIM.
MYER M. GLASBERG.